US010679217B2

(12) United States Patent
Li (10) Patent No.: US 10,679,217 B2
(45) Date of Patent: Jun. 9, 2020

(54) METHODS AND DEVICES FOR SENDING TRANSACTION INFORMATION AND FOR CONSENSUS VERIFICATION

(71) Applicant: Alibaba Group Holding Limited, George Town (KY)

(72) Inventor: Ning Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/523,580

(22) Filed: Jul. 26, 2019

(65) Prior Publication Data

US 2019/0347663 A1    Nov. 14, 2019

Related U.S. Application Data

(63) Continuation of application No. PCT/CN2018/079439, filed on Mar. 19, 2018.

(30) Foreign Application Priority Data

Mar. 24, 2017  (CN) .......................... 2017 1 0181241

(51) Int. Cl.
  *G06Q 20/40*   (2012.01)
  *G06Q 20/38*   (2012.01)
  *H04L 9/06*    (2006.01)
  *H04L 29/08*   (2006.01)

(52) U.S. Cl.
  CPC ....... *G06Q 20/401* (2013.01); *G06Q 20/3821* (2013.01); *H04L 9/0637* (2013.01); *H04L 67/104* (2013.01)

(58) Field of Classification Search
  CPC ............... G06Q 20/349; G06Q 20/027; G06Q 20/3255; G06Q 20/023; G06Q 20/383; G06Q 20/407; G06Q 20/322
  See application file for complete search history.

(56) References Cited

U.S. PATENT DOCUMENTS 5,819,020 A * 10/1998 Beeler, Jr. ........... G06F 11/2071
                                                              714/5.11
5,931,917 A *  8/1999 Nguyen ................. G06Q 20/12
                                                              709/203
(Continued)

FOREIGN PATENT DOCUMENTS

CN      105488665      4/2016
CN      106372868      2/2017
(Continued)

OTHER PUBLICATIONS

Andreas Antonopoulos, "Mastering Bitcoin" Early release. 2010. (Year: 2010).*

(Continued)

*Primary Examiner* — Johann Y Choo
(74) *Attorney, Agent, or Firm* — Fish & Richardson P.C.

(57) ABSTRACT

Examples of methods and devices for sending transaction information and performing consensus verification are described. In one example of the methods, a first consensus node receives transaction information and sends the transaction information to a second consensus node. The first consensus node receives a consensus verification failure notification from the second consensus node. The consensus verification failure notification includes an information identifier of the transaction information. In response to receiving the consensus verification failure notification, the first consensus node resends the transaction information to the second consensus node based at least on the consensus verification failure notification.

20 Claims, 5 Drawing Sheets

(56) References Cited

U.S. PATENT DOCUMENTS

2010/0017495 A1   1/2010  Lamport
2016/0350728 A1  12/2016  Melika et al.

FOREIGN PATENT DOCUMENTS

| CN | 106445711    |   | 2/2017  |
|----|--------------|---|---------|
| CN | 106503589    |   | 3/2017  |
| CN | 106503589 A  | * | 3/2017  |
| CN | 106506146    |   | 3/2017  |
| CN | 106506146 A  | * | 3/2017  |
| CN | 107392611    |   | 11/2017 |
| CN | 107392611 A  | * | 11/2017 |
| RU | 2580086      |   | 4/2016  |
| RU | 2016123959   |   | 12/2017 |
| TW | 201602933    |   | 1/2016  |

OTHER PUBLICATIONS

PCT International Search Report and Written Opinion in International Application No. PCT/CN2018/079439, dated Jun. 27, 2018, 9 pages (with partial English translation).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

European Extended Search Report in European Patent Application No. 18770722.9, dated Oct. 31, 2019, 9 pages.

International Preliminary Report on Patentability in International Application No. PCT/CN2018/079439, dated Sep. 24, 2019, 10 pages (with English Translation).

Antonopoulos, "Mastering bitcoin: Unlocking Digital Cryptocurrencies," O'Reilly Media, Early release 2014, pp. 113-122; 140-159; 179-182; 200-201.

Anonymous, Bitcoin Core [Online], "Compact Blocks FAQ," Jun. 2016, [Retrieved on Oct. 21, 2019], retrieved from: URL <https://bitcoincore.org/en/2016/06/07/compact-blocks-faq/>, 7 pages.

Wikipedia [Online], "Transmission Control Protocol," Mar. 2017, [Retrieved on Oct. 21, 2019], retrieved from: URL<https://en.wikipedia.org/w/index.php?title=Transmission_Control_Protocol&oldid=770943421>, 12 pages.

\* cited by examiner

METHODS AND DEVICES FOR SENDING TRANSACTION INFORMATION AND FOR CONSENSUS VERIFICATION

CROSS-REFERENCE TO RELATED APPLICATIONS

This application is a continuation of PCT Application No. PCT/CN2018/079439, filed on Mar. 19, 2018, which claims priority to Chinese Patent Application No. 201710181241.4, filed on Mar. 24, 2017, and each application is hereby incorporated by reference in its entirety.

TECHNICAL FIELD

The present application relates to the field of blockchain technologies, and in particular, to methods and devices for sending transaction information and for consensus verification.

BACKGROUND

In the field of blockchain technologies, a blockchain node responsible for performing consensus verification on transactions is referred to as a consensus node.

In a consensus verification phase, a consensus node that initiates consensus verification needs to pack transaction information of transactions generated within a time period into a preprocessed block and send the preprocessed block to another consensus node for consensus verification, and the other consensus node verifies whether a transaction pool of the other consensus node includes all transaction information in the preprocessed block. A verification result is that the consensus verification succeeds if the transaction pool includes all the transaction information in the preprocessed block. A verification result is that the consensus verification fails if the transaction pool does not include all the transaction information in the preprocessed block. Subsequently, consensus nodes reach a consensus that the transaction information in the preprocessed block is valid or invalid based on verification results of the consensus nodes on the preprocessed block, and use the consensus as a result of performing consensus verification by the consensus nodes on the preprocessed block. Therefore, it needs to be ensured that transaction information stored in transaction pools of the consensus nodes is consistent, to make the consensus verification result of the consensus nodes as accurate as possible.

In a transaction handling phase, for different transactions, each consensus node can serve as a transaction handling node (which is referred to as a handling node blow) to obtain transaction information of a transaction. For a transaction, a handling node that corresponds to the transaction needs to send transaction information to each other consensus node, and another consensus node that receives the transaction information stores the transaction information in a transaction pool of the other consensus node. Consensus nodes maintain consistent transaction information that is stored in transaction pools of the consensus nodes by using such a method.

However, because network disturbances are always inevitable, the network instability often leads to the instability of information transmission between consensus nodes, and some consensus nodes may fail to receive sent information. For example, a handling node sends transaction information to other consensus nodes. If a network disturbance occurs, the transaction information sent by the handling node to the other consensus nodes may not be received by all the other consensus nodes. Consequently, transaction information stored in transaction pools of the consensus nodes cannot maintain consistent, thereby reducing the accuracy of a consensus verification result of the consensus nodes.

SUMMARY

Implementations of the present application provide methods and devices for sending transaction information and for consensus verification, to alleviate the problem that the accuracy of a consensus verification result of consensus nodes is reduced by using an existing method for sending transaction information and performing consensus verification.

To alleviate the previous technical problem, the implementations of the present application are implemented as follows:

An implementation of the present application provides a method for sending transaction information, where the method includes the following: obtaining, by a consensus node, transaction information; sending the transaction information to another consensus node; and resending the transaction information based on a consensus verification failure notification when receiving the consensus verification failure notification that is sent by the other consensus node and that includes an information identifier of the transaction information.

An implementation of the present application provides a method for consensus verification, where the method includes the following: receiving, by a consensus node, a preprocessed block sent by another consensus node; performing consensus verification on the preprocessed block based on transaction information stored in a transaction pool and transaction information included in the preprocessed block; and in a consensus verification process, if it is determined that at least one piece of transaction information included in the preprocessed block does not exist in the transaction pool, determining an information identifier of the transaction information missing from the transaction pool in the transaction information included in the preprocessed block, and sending a consensus verification failure notification that includes the information identifier to the other consensus nodes.

An implementation of the present application provides a device for sending transaction information, where the device includes the following: an acquisition module, configured to obtain transaction information; a first sending module, configured to send the transaction information to another consensus node; and a second sending module, configured to resend the transaction information based on a consensus verification failure notification when the consensus verification failure notification that is sent by the other consensus node and that includes an information identifier of the transaction information is received.

An implementation of the present application provides a device for consensus verification, where the device includes the following: a receiving module, configured to receive a preprocessed block sent by another consensus node; a consensus verification module, configured to perform consensus verification on the preprocessed block based on transaction information stored in a transaction pool and transaction information included in the preprocessed block; and a sending module, configured to: in a consensus verification process, if it is determined that at least one piece of transaction information included in the preprocessed block does not exist in the transaction pool, determine an information identifier of the transaction information missing from the transaction pool in the transaction information included in the preprocessed block, and send a consensus verification failure notification that includes the information identifier to the other consensus nodes.

It can be seen from the technical solutions provided in the previous implementations of the present application that, in the implementations of the present application, if another consensus node fails to receive transaction information sent by a handling node in a transaction handling phase, the other consensus node can send a consensus verification failure notification that includes an information identifier of the transaction information to the handling node in a consensus verification phase if the other consensus node determines that the transaction information included in a preprocessed block does not exist in a transaction pool of the other consensus node, so that the handling node resends the transaction information to the other consensus node. According to the implementations of the present application, it can be ensured as much as possible that transaction information stored in transaction pools of consensus nodes is consistent, and thus the accuracy of a consensus verification result of the consensus nodes is not reduced.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings from these accompanying drawings without creative efforts.

DESCRIPTION OF IMPLEMENTATIONS

Implementations of the present application provide a method and a device for sending transaction information and for consensus verification.

To make a person skilled in the art understand the technical solutions in the present application better, the following clearly and comprehensively describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Figure 1:
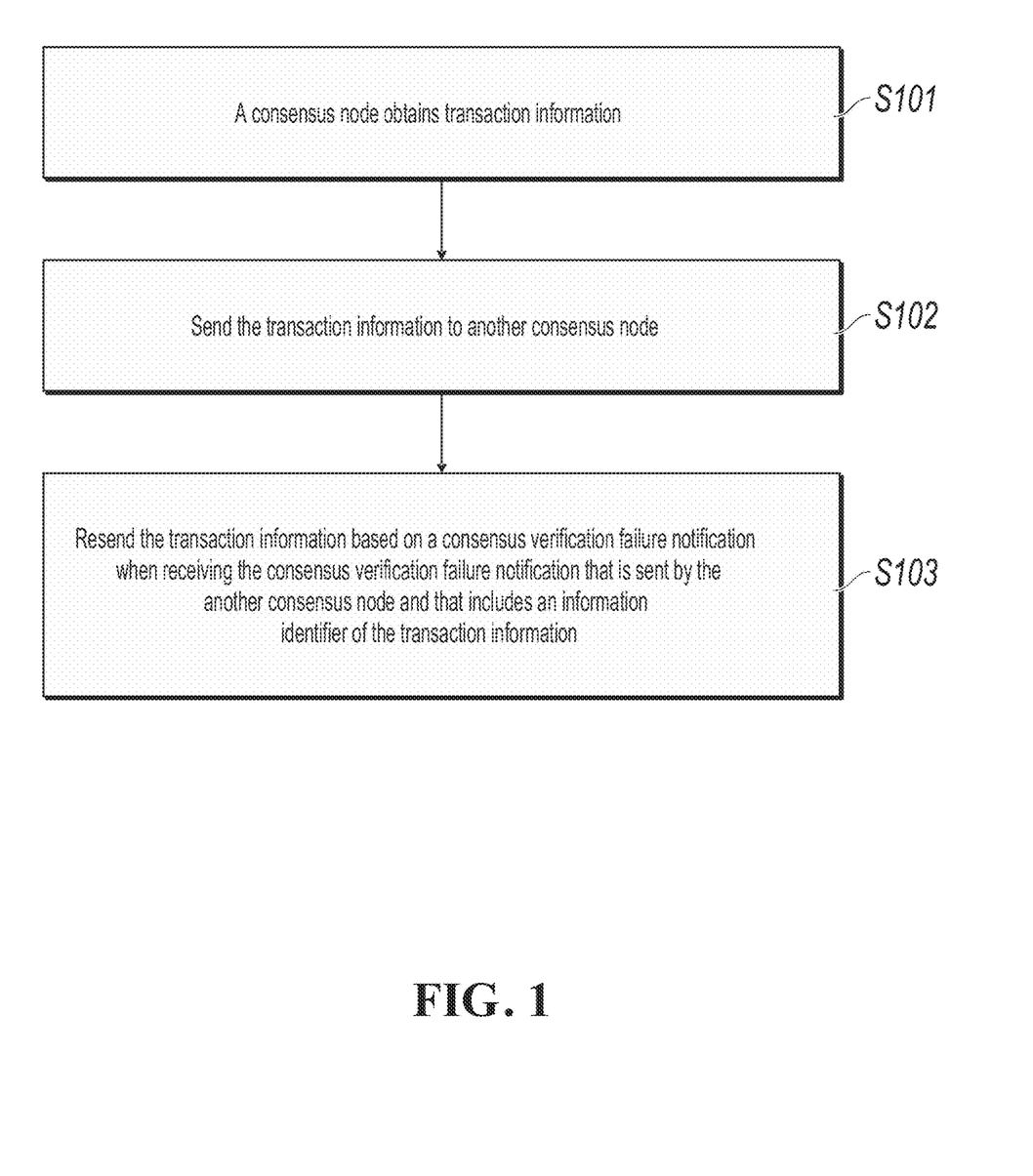
FIG. 1 is a flowchart illustrating an example of a method for sending transaction information, according to an implementation of the present application.

FIG. 1 is a flowchart illustrating a method for sending transaction information, according to an implementation of the present application. The method includes the following steps.

S101. A consensus node obtains transaction information.

In the present implementation of the present application, the transaction information can be all details involved in a transaction, such as an account address, a transaction amount, and a transaction type.

In a transaction handling phase, the consensus node serves as a handling node, and can receive transaction information sent by a client device. The client device can be a client device of a blockchain node that participates in the transaction. Certainly, the consensus node can initiate a transaction by itself and generate transaction information of the transaction.

For ease of description, the handling node described below is a consensus node that handles a transaction in a handling phase, and is an execution body of the present implementation of the present application.

S102. Send the transaction information to another consensus node.

After obtaining the transaction information, the handling node stores the transaction information in a transaction pool of the handling node, and sends the transaction information to the other consensus node, so that the other consensus node stores the transaction information in a transaction pool of the other consensus node after receiving the transaction information. Then, in a consensus verification phase, each consensus node can verify a preprocessed block by determining whether transaction information stored in a transaction pool of the consensus node includes all transaction information in the preprocessed block.

The other consensus node is a consensus node other than the handling node. The transaction pool is a database used to store transaction information. Each consensus node has its own transaction pool. The transaction pool can be constructed in a memory of the consensus node or an external memory of the consensus node.

It is worthwhile to emphasize that each consensus node can carry out multi-process work, that is, simultaneously handle transaction A and participate in consensus verification on a preprocessed block (which does not include transaction A) that includes a batch of transaction information. As long as the computing capability is enough, the consensus node can simultaneously handle different transactions or perform consensus verification through a plurality of processes.

In the present implementation of the present application, to describe in detail how to ensure as much as possible that each other consensus node receives transaction information of a transaction, the transaction handling phase and the consensus verification phase are described relative to transaction information of the same transaction.

In the present implementation of the present application, the consensus node can create a thread for each other consensus node, and send the transaction information to the other consensus node through the thread. The consensus node can send the transaction information through the thread by using an asynchronous invocation technology. After the transaction information is sent, the thread is revoked regardless of whether the other consensus node can receive the transaction information. Alternatively, the consensus node can send the transaction information by using a synchronous invocation technology. After sending the transaction information, the consensus node continues to use the thread to wait for receiving a response signal returned by the other consensus node after the other consensus node receives the transaction information.

S103. Resend the transaction information based on a consensus verification failure notification when receiving the consensus verification failure notification that is sent by the other consensus node and that includes an information identifier of the transaction information.

In the present implementation of the present application, the consensus verification failure notification is sent by the other consensus node in the subsequent consensus verification phase. In the consensus verification phase, a consensus node (which is referred to as a leader node blow) that initiates a consensus packs transaction information of a batch of transactions in a transaction pool of the consensus node into a preprocessed block, and sends the preprocessed block to a consensus node (which is referred to as a replica node) other than the leader node, so that consensus nodes (the leader node and replica nodes) perform consensus verification on the preprocessed block. The leader node can be elected by the consensus nodes, or can be randomly specified.

It is worthwhile to emphasize that the present implementation of the present application is performed by the handling node in the transaction handling phase. In the consensus verification phase, the handling node can be a leader node or a replica node. Implementations are not limited in the present application. In addition, the other consensus node is a consensus node other than the handling node in the handling phase, and the other consensus node usually can be a replica node or a leader node.

In brief, an identity of each consensus node may change accordingly after the transition from the transaction handling phase to the consensus verification phase. The previous handling node may become a replica node, and another previous consensus node may become a leader node.

In the present implementation of the present application, when verifying the preprocessed block, a replica node compares the transaction information in the preprocessed block with transaction information stored in a transaction pool of the replica node. If the transaction information stored in the transaction pool of the replica node includes all transaction information in the preprocessed block, it indicates that the replica node successfully receives the transaction information in the previous transaction handling phase.

If the transaction information stored in the transaction pool of the replica node does not include all transaction information in the preprocessed block, in other words, if some transaction information in the preprocessed block is missing from the transaction information stored in the transaction pool of the replica node, it indicates that the replica node has not successfully received the transaction information in the previous transaction handling phase. In this case, verification performed by the replica node on the preprocessed block fails, and the replica node broadcasts a consensus verification failure notification that includes an information identifier of the missing transaction information to other replica nodes and the leader node. Each consensus node that receives the consensus verification failure notification can check a transaction pool of the consensus node, and send the transaction information that corresponds to the information identifier to the replica node that sends the consensus verification failure notification, if the transaction pool of the consensus node stores the transaction information that corresponds to the information identifier included in the consensus verification failure notification (the consensus node successfully receives the transaction information in the transaction handling phase or the consensus node is the handling node).

It is worthwhile to emphasize that there are usually a very large number of pieces of transaction information included in the preprocessed block, and the transaction information is usually broadcast by different handling nodes. Therefore, in the consensus verification phase, each consensus node may lack some transaction information included in the preprocessed block. The transaction information that each consensus node lacks is certainly stored in a transaction pool of a handling node that originally broadcasts the transaction information. In addition, the transaction information that each consensus node lacks can be stored in a transaction pool of more than one other consensus node. In other words, in the consensus verification phase, the transaction information that each consensus node lacks can be compensated for through joint assistance of other consensus nodes.

For example, there are five consensus nodes A, B, C, D, and E in a blockchain network. In a consensus verification phase, A that serves as a leader node generates a preprocessed block, and transaction information included in the preprocessed block is L, M, and N. L is broadcast by E when E serves as a handling node, M is broadcast by A when A serves as a handling node, and N is broadcast by D when D serves as a handling node. Assume that B and C fail to receive L in a handling phase of L, B and E fails to receive M in a handling phase of M, B fails to receive N in a handling phase of N. In this case, in a consensus verification phase, after A sends the preprocessed block to B, C, D, and E, B sends a consensus verification failure notification that includes information identifiers of L, M, and N to A, C, D and E because L, M, and N are missing from a transaction pool of B. As such, B separately receives L, M, and N sent by A; M and N sent by C; L, M, and N sent by D; and L and N sent by E. In other words, the transaction information missing from the transaction pool of B can be compensated for through consensus assistance of A, C, D, and E.

In addition, because of network disturbances, all consensus nodes that receive the consensus verification failure notification send the transaction information to the replica node through compensation. In fact, it can be ensured that the replica node receives the transaction information in a large probability, thereby alleviating the network disturbances and ensuring the consistency in transaction pools of the consensus nodes.

In conclusion, in the present implementation of the present application, after sending the transaction information to the other consensus node, regardless of whether each other consensus node receives the transaction information, the consensus node can wait until the consensus verification phase to resend, through compensation, the transaction information to the other consensus node that sends the consensus verification failure notification based on the received consensus verification failure notification.

It can be seen that, according to the method for sending information shown in FIG. 1, if another consensus node fails to receive transaction information sent by a handling node in a transaction handling phase, the other consensus node can send a consensus verification failure notification that includes an information identifier of the transaction information to the handling node in a consensus verification phase if the other consensus node determines that the transaction information included in a preprocessed block does not exist in a transaction pool of the other consensus node, so that the handling node resends the transaction information to the other consensus node. According to the present implementation of the present application, it can be ensured as much as possible that transaction information stored in transaction pools of consensus nodes is consistent, and thus the accuracy of a consensus verification result of the consensus nodes is not reduced.

Further, in the present implementation of the present application, some reliable mechanisms can be used in the transaction handling phase to enhance the reliability of sending the transaction information by the consensus node to the other consensus node.

In step S102, the consensus node creates a thread for each other consensus node, and sends the transaction information to the other consensus node through the thread; and resends the transaction information to the other consensus node through the thread if it is determined that the other consensus node fails to receive the transaction information, until it is determined that the other consensus node receives the transaction information or a predetermined sending stop condition is satisfied.

It is determined that the other consensus node receives the transaction information if a response signal returned by the other consensus node is received through the thread within a specified time period. It is determined that the other consensus node fails to receive the transaction information if no response signal returned by the other consensus node is received through the thread within the specified time period.

The predetermined sending stop condition can be as follows: The number of times of sending the transaction information to the other consensus node reaches the predetermined number of times, or a time that elapsed since the first time the transaction information was sent to the other consensus node exceeds predetermined duration. The predetermined number of times and the predetermined duration are not limited in the present application.

It is worthwhile to note that the consensus node can resend the transaction information to the other consensus node through the thread each time by using the following method: The consensus node can resend the transaction information once it is determined that the previous sending fails, or can wait for a particular time interval to delay sending. The particular time interval can be configured, and the particular time interval for waiting for each resending can be the same or different. For example, the particular time interval gradually increases or decreases.

For example, the consensus node creates a thread for each other consensus node, and first sends the transaction information to the other consensus node through the thread. The consensus node can resend the transaction information after a delay of 5 S if the other consensus node returns no response signal, can resend the transaction information after a delay of 15 S if still no response signal is received, and can resend the transaction information after a delay of a longer time if still no corresponding signal is received. Resending of the transaction information continues like this way until the number of sending times reaches the predetermined number of times or the time that elapsed since the first time the transaction information was sent to the other consensus node exceeds the predetermined duration.

Particularly, in the previous example, if the number of times the consensus node sends the transaction information reaches the predetermined number of times, the consensus node can further add the transaction information to a back queue, and create a thread Recovery specially used for scanning the back queue. The Recovery scans the back queue every particular time interval to identify the transaction information, and the transaction information is sent through the Recovery until the time that elapsed since the first time the transaction information was sent to the other consensus node exceeds the predetermined duration. Certainly, the particular time interval that the Recovery scans the back queue can also be configured. That is, the thread whose number of times of sending the transaction information reaches the predetermined number of times is revoked to save resources of the consensus node, the transaction information is added to the back queue, and the standing Recovery thread is responsible for scanning the back queue and sending the transaction information every particular time interval. As such, the resource waste caused by maintaining a relatively large number of threads by the consensus node can be alleviated.

In the previous example, the consensus node actually sends the transaction information to the other consensus node by using a weak synchronization invocation technology. After asynchronously invoking a thread for each other consensus node, the consensus node sends the transaction information to the other consensus node through the thread by using synchronization invocation. The thread occupies a computing resource of the consensus node, and the consensus node waits, through the thread, for the other consensus node to return the response signal. In addition, if the other consensus node fails to return the response signal within a specified time period, it indicates that the other consensus node fails to receive the transaction information, and the consensus node resends the transaction information to the other consensus node through the thread. As such, using the weak synchronization invocation technology in the transaction handling phase can make the consensus node do not need to put aside more important work processes to specially wait for the response signal returned by the other consensus node, and the consensus node can also use the thread that corresponds to each other consensus node to wait for the response signal and to repeatedly send the transaction information, thereby ensuring that the other consensus node successfully receives the transaction information.

In addition, in the present implementation of the present application, when the predetermined sending stop condition is satisfied, the transaction information can be added to the predetermined queue if the other consensus node still returns no response signal. When receiving the consensus verification failure notification, the queue is searched for the transaction information that corresponds to the information identifier based on the information identifier included in the consensus verification failure notification, and the transaction information is sent.

The queue is storage space in the memory of the consensus node, and is configured to store transaction information that the consensus node repeatedly attempts to send in the handling phase but that is still not received by each other consensus node. The transaction information that the consensus node repeatedly attempts to send but that still fails to be received is stored in the queue when the transaction pool of the consensus node is not constructed in the memory, so that the consensus node can send the transaction information more quickly to the other consensus node that lacks the transaction information in the consensus verification phase.

Particularly, when the transaction pool is not constructed in the memory, in the consensus verification phase, when receiving a consensus verification failure notification sent by a replica node, the consensus node should check whether the queue of the consensus node includes transaction information that the replica node lacks, instead of checking the transaction pool of the consensus node; and can send the transaction information to the replica node if the queue of the consensus node includes the transaction information that the replica node lacks; or does not need to send the transaction information to the replica node if the queue of the consensus node does not include the transaction information that the replica node lacks (even if the transaction pool of the consensus node includes a transaction that the replica node lacks). As such, if the replica node lacks transaction information X, it can always be ensured that a handling node that broadcasts transaction information X obtains transaction information X from a queue of the handling node and sends transaction information X. Therefore, the replica node that lacks the transaction information can always be compensated quickly.

Figure 2:
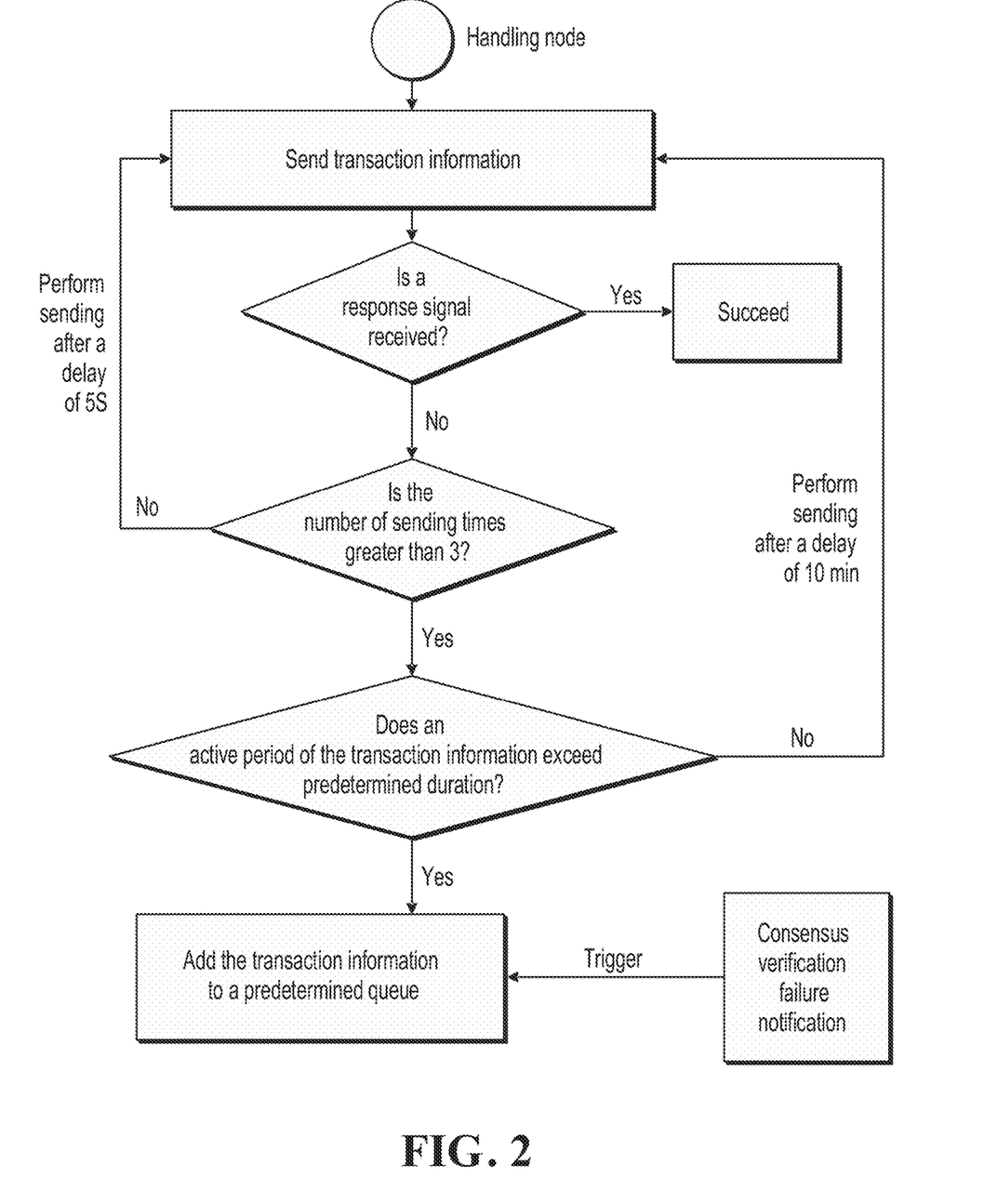
FIG. 2 is a schematic diagram illustrating an example of a mechanism in a transaction handling phase, according to an implementation of the present application.

FIG. 2 is a schematic diagram illustrating a reliable mechanism in a transaction handling phase, according to an implementation of the present application. As shown in FIG. 2, in a transaction handling phase, a handling node attempts to send transaction information to another consensus node by using a method such as a delay of 5 S or a delay of 10 min, and the method for attempting to send the transaction information is restrained. That is, the transaction information is sent by using a longer delay when the number of sending times is greater than 3. The transaction information is added to a predetermined queue and sending stops when an active period of the transaction information (a time that elapsed since the first time the transaction information was sent to the other consensus node) exceeds predetermined duration (for example, one hour). In a consensus verification phase, the consensus node activates the transaction information in the queue only when receiving a consensus verification failure notification.

It is worthwhile to emphasize that the predetermined duration can be determined based on a period in which each consensus node performs consensus verification, or can be determined based on a troubleshooting period of a common network fault.

According to the reliable mechanism shown in FIG. 2, the consensus node delays attempting to send the transaction information, and after the consensus node repeatedly sends the transaction information after a delay of 5 S two times, it indicates that there is a transmission problem that cannot be resolved temporarily (which may be that another consensus node that has not successfully received the transaction information goes down or a large fault occurs in a network). Therefore, the consensus node temporarily stops sending the transaction information to the other consensus node. After waiting for a relatively long time (for example, 10 min), the transmission problem may have been alleviated, and then the consensus node continues to send the transaction information. If the active period of the transaction information is too long, the transaction information can be added to the predetermined queue to wait for subsequently resending, through compensation, the transaction information to the other consensus node that lacks the transaction information.

In the present implementation of the present application, in the consensus verification phase, consensus nodes jointly compensate each consensus node that lacks the transaction information, so that the problem of the inconsistency in transaction pools of the consensus nodes that is caused by network disturbances can be well alleviated. On this basis, according to the reliable mechanism shown in FIG. 2, measures can be used in the transaction handling phase to increase a success rate of receiving the transaction information by the other consensus node.

Figure 3:
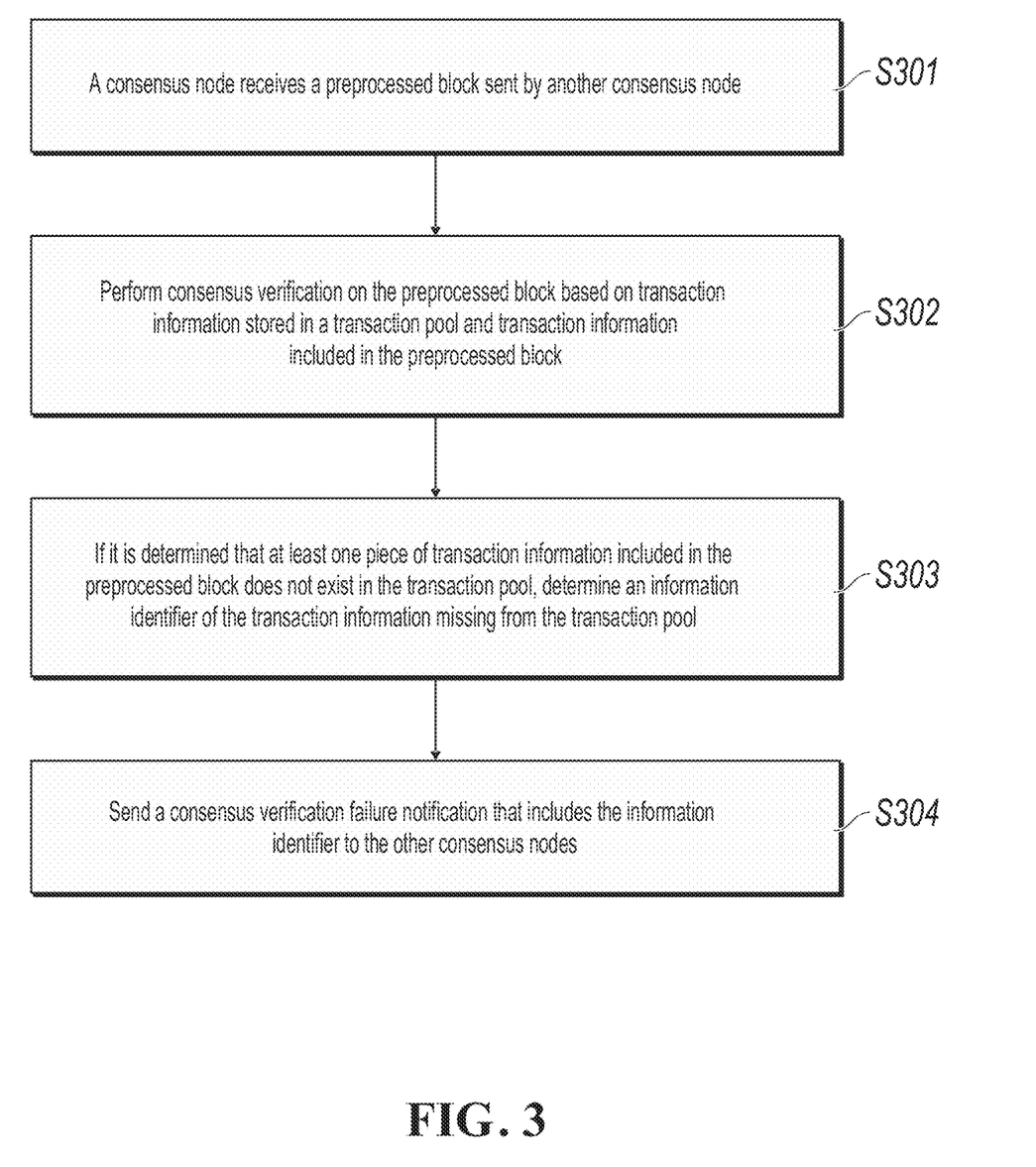
FIG. 3 is a flowchart illustrating an example of a method for consensus verification, according to an implementation of the present application.

FIG. 3 is a method for consensus verification, according to an implementation of the present application. The method includes the following steps:

S301. A consensus node receives a preprocessed block sent by another consensus node.

S302. Perform consensus verification on the preprocessed block based on transaction information stored in a transaction pool and transaction information included in the preprocessed block.

S303. In a consensus verification process, if it is determined that at least one piece of transaction information included in the preprocessed block does not exist in the transaction pool, determine an information identifier of the transaction information missing from the transaction pool in the transaction information included in the preprocessed block.

S304. Send a consensus verification failure notification that includes the information identifier to the other consensus nodes.

In the present implementation of the present application, the consensus node is a consensus node that verifies the preprocessed block in the consensus verification phase, namely, a replica node. The other consensus node is a node that initiates a consensus, namely, a leader node.

Detailed description of the method for consensus verification shown in FIG. 3 has been recorded in the description of the method for sending transaction information shown in FIG. 1. Details are omitted here for simplicity.

Figure 4:
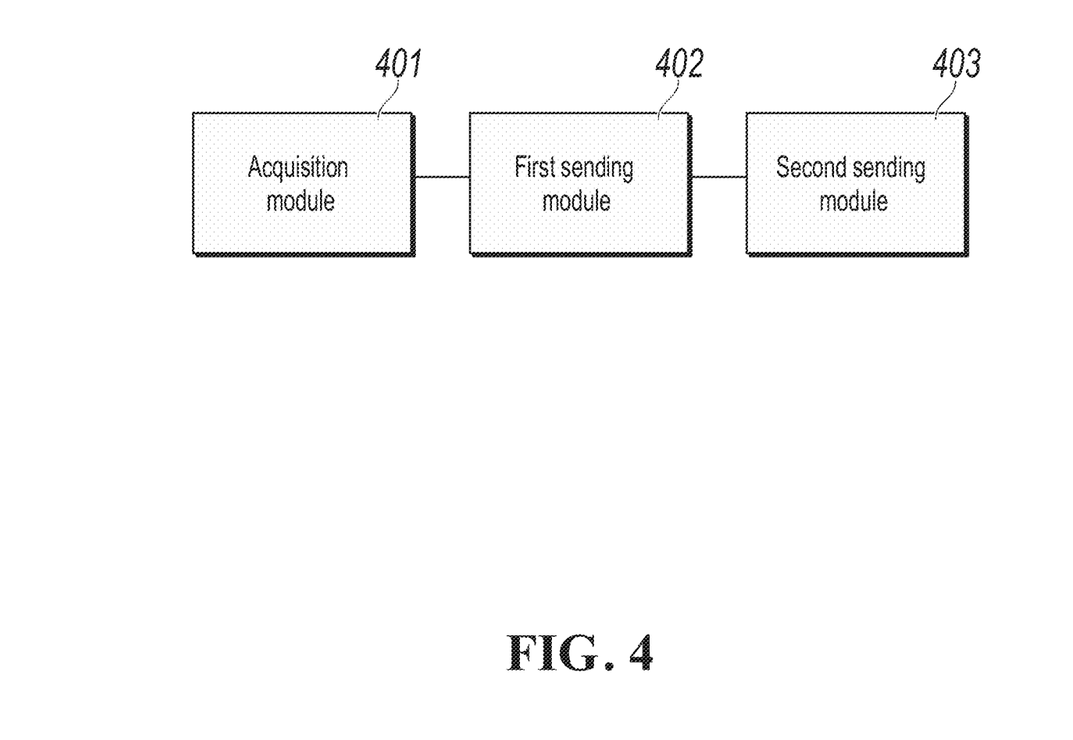
FIG. 4 is a schematic diagram illustrating an example of a device for sending transaction information, according to an implementation of the present application.

Based on the method for sending transaction information shown in FIG. 1, an implementation of the present application further correspondingly provides a device for sending transaction information. As shown in FIG. 4, the device includes the following: an acquisition module 401, configured to obtain transaction information; a first sending module 402, configured to send the transaction information to another consensus node; and a second sending module 403, configured to resend the transaction information based on a consensus verification failure notification when the consensus verification failure notification that is sent by the other consensus node and that includes an information identifier of the transaction information is received.

The acquisition module 401 is configured to receive transaction information sent by a client device.

The first sending module 402 is configured to create a thread for each other consensus node, and send the transaction information to the other consensus node through the thread.

The first sending module 402 is configured to resend the transaction information to the other consensus node through the thread if it is determined that the other consensus node fails to receive the transaction information, until it is determined that the other consensus node receives the transaction information or a predetermined sending stop condition is satisfied.

The first sending module 402 is configured to determine that the other consensus node receives the transaction information if a response signal returned by the other consensus node is received through the thread within a specified time period; or determine that the other consensus node fails to receive the transaction information if no response signal returned by the other consensus node is received through the thread within the specified time period.

The predetermined sending stop condition can include the following: The number of times of sending the transaction information to the other consensus node reaches the predetermined number of times, or a time that elapsed since the first time the transaction information was sent to the other consensus node exceeds predetermined duration.

The device further includes an adding module 404, configured to add the transaction information to a predetermined queue when the predetermined sending stop condition is satisfied.

The second sending module 403 is configured to search the queue for the transaction information that corresponds to the information identifier based on the information identifier included in the consensus verification failure notification, and send the transaction information.

Figure 5:
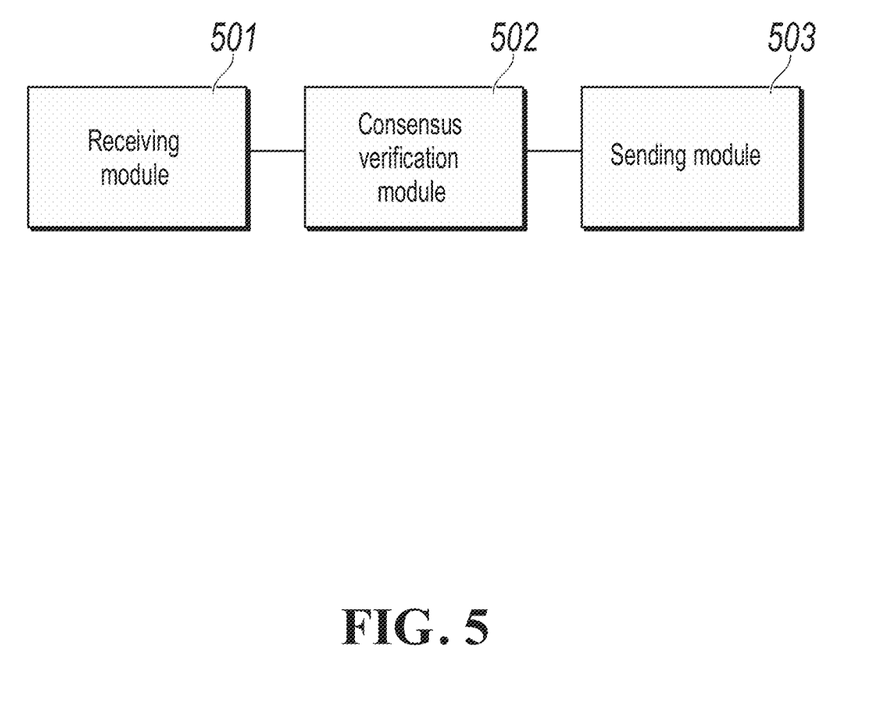
FIG. 5 is a schematic diagram illustrating an example of a device for consensus verification, according to an implementation of the present application.

Based on the method for consensus verification shown in FIG. 3, an implementation of the present application further correspondingly provides a device for consensus verification. As shown in FIG. 5, the device includes the following: a receiving module 501, configured to receive a preprocessed block sent by another consensus node; a consensus verification module 502, configured to perform consensus verification on the preprocessed block based on transaction information stored in a transaction pool and transaction information included in the preprocessed block; and a sending module 503, configured to: in a consensus verification process, if it is determined that at least one piece of transaction information included in the preprocessed block does not exist in the transaction pool, determine an information identifier of the transaction information missing from the transaction pool in the transaction information included in the preprocessed block, and send a consensus verification failure notification that includes the information identifier to the other consensus nodes.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor and a computer readable medium storing computer readable program code (such as software or firmware) that can be executed by the microprocessor or the processor, a logic gate, a switch, an application-specific integrated circuit (ASIC), a programmable logic controller, or a built-in microcontroller. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device included in the controller and configured to implement various functions can also be considered as a structure in the hardware component. Or the device configured to implement various functions can even be considered as both a software module implementing the method and a structure in the hardware component.

The system, device, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the device above is described by dividing functions into various units. Certainly, when the present application is implemented, the functions of the units can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, a built-in processor, or a processor of another programmable data processing device to generate a machine, so that the instructions executed by the computer or the processor of the other programmable data processing device generate a device for implementing a specified function in one or more processes in the flowcharts and/or in one or more blocks in the block diagrams.

These computer program instructions can be stored in a computer readable memory that can instruct the computer or the other programmable data processing device to work in a specific way, so that the instructions stored in the computer readable memory generate an artifact that includes an instruction device. The instruction device implements a specified function in one or more processes in the flowcharts and/or in one or more blocks in the block diagrams.

These computer program instructions can be loaded onto the computer or another programmable data processing device, so that a series of operations and operations and steps are performed on the computer or the other programmable device, thereby generating computer-implemented processing. Therefore, the instructions executed on the computer or the other programmable device provide steps for implementing a specified function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store messages by using any method or technology. The message can be a computer readable instruction, a data structure, a program module, or other data. Examples of a computer storage medium include but are not limited to: a parameter random access memory (PRAM), a static random access memory (SRAM), a dynamic random access memory (DRAM) or another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic tape/magnetic disk memory or another magnetic storage device, or any other non-transmission medium that can be used to store messages that can be accessed by a computing device. Based on the definition in the present specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that an implementation of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For the same or similar parts of the implementations, references can be made to the implementations. Each implementation focuses on a difference from other implementations. Particularly, a system implementation is basically similar to a method implementation, and therefore is described briefly. For related parts, references can be made to related descriptions in the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for sending transaction information, comprising:
   receiving, by a first consensus node, transaction information;
   sending the transaction information to a second consensus node;
   receiving a consensus verification failure notification from the second consensus node, wherein the consensus verification failure notification comprises an information identifier of the transaction information, wherein the consensus verification failure notification indicates that at least a portion of the transaction information is missing from a transaction pool of the second consensus node and that a verification on the transaction information fails;

in response to receiving the consensus verification failure notification, determining whether a transaction pool of the first consensus node stores the transaction information that corresponds to the information identifier comprised in the consensus verification failure notification; and in response to determining that the transaction pool of the first consensus node stores the transaction information that corresponds to the information identifier comprised in the consensus verification failure notification, resending, by the first consensus node, the transaction information that corresponds to the information identifier to the second consensus node.

2. The computer-implemented method of claim 1, wherein receiving, by the first consensus node, the transaction information comprises:

receiving, by the first consensus node, the transaction information from a client device.

3. The computer-implemented method of claim 1, wherein sending the transaction information to the second consensus node comprises:

creating a thread for each other consensus node; and
sending the transaction information to the second consensus node through the thread.

4. The computer-implemented method of claim 3, wherein sending the transaction information to the second consensus node through the thread comprises:

resending the transaction information to the second consensus node through the thread in response to determining that the second consensus node fails to receive the transaction information, until it is determined that the second consensus node receives the transaction information or a predetermined sending stop condition is satisfied.

5. The computer-implemented method of claim 4, wherein determining that the second consensus node receives the transaction information comprises:

determining that the second consensus node receives the transaction information in response to determining that a response signal returned by the second consensus node is received through the thread within a specified time period; and wherein determining that the second consensus node fails to receive the transaction information comprises:

determining that the second consensus node fails to receive the transaction information in response to determining that no response signal returned by the second consensus node is received through the thread within the specified time period.

6. The computer-implemented method of claim 4, wherein the predetermined sending stop condition comprises:

a number of times of sending the transaction information to the second consensus node reaches a predetermined number of times; or a time duration that elapsed since a first time the transaction information was sent to the second consensus node exceeds a predetermined duration.

7. The computer-implemented method of claim 4, wherein in response to determining that the predetermined sending stop condition is satisfied, the method further comprises:

adding the transaction information to a predetermined queue; and wherein resending the transaction information to the second consensus node based on the consensus verification failure notification comprises:

searching the predetermined queue for the transaction information that corresponds to the information identifier of the transaction information in the consensus verification failure notification; and sending the transaction information to the second consensus node.

8. The computer-implemented method of claim 1, further comprising:

receiving, by the second consensus node, a preprocessed block from the first consensus node;

performing consensus verification on the preprocessed block based on transaction information stored in a transaction pool of the second consensus node and transaction information comprised in the preprocessed block;

in response to determining that at least a portion of the transaction information comprised in the preprocessed block does not exist in the transaction pool of the second consensus node, determining, by the second consensus node, an information identifier of the transaction information comprised in the preprocessed block; and sending, by the second consensus node, a consensus verification failure notification to the first consensus node, wherein the consensus verification failure notification comprises the information identifier of the transaction information.

9. A non-transitory computer-readable medium storing one or more instructions executable by a computer system to perform operations comprising:

receiving, by a first consensus node, transaction information;

sending the transaction information to a second consensus node;

receiving a consensus verification failure notification from the second consensus node, wherein the consensus verification failure notification comprises an information identifier of the transaction information, wherein the consensus verification failure notification indicates that at least a portion of the transaction information is missing from a transaction pool of the second consensus node and that a verification on the transaction information fails;

in response to receiving the consensus verification failure notification, determining whether a transaction pool of the first consensus node stores the transaction information that corresponds to the information identifier comprised in the consensus verification failure notification; and in response to determining that the transaction pool of the first consensus node stores the transaction information that corresponds to the information identifier comprised in the consensus verification failure notification, resending, by the first consensus node, the transaction information that corresponds to the information identifier to the second consensus node.

10. The non-transitory computer-readable medium of claim 9, wherein sending the transaction information to the second consensus node comprises:

creating a thread for each other consensus node; and
sending the transaction information to the second consensus node through the thread.

11. The non-transitory computer-readable medium of claim 10, wherein sending the transaction information to the second consensus node through the thread comprises:
resending the transaction information to the second consensus node through the thread in response to determining that the second consensus node fails to receive the transaction information, until it is determined that the second consensus node receives the transaction information or a predetermined sending stop condition is satisfied.

12. The non-transitory computer-readable medium of claim 11, wherein determining that the second consensus node receives the transaction information comprises:
determining that the second consensus node receives the transaction information in response to determining that a response signal returned by the second consensus node is received through the thread within a specified time period; and
wherein determining that the second consensus node fails to receive the transaction information comprises:
determining that the second consensus node fails to receive the transaction information in response to determining that no response signal returned by the second consensus node is received through the thread within the specified time period.

13. The non-transitory computer-readable medium of claim 11, wherein the predetermined sending stop condition comprises:
a number of times of sending the transaction information to the second consensus node reaches a predetermined number of times; or
a time duration that elapsed since a first time the transaction information was sent to the second consensus node exceeds a predetermined duration.

14. The non-transitory computer-readable medium of claim 11, wherein in response to determining that the predetermined sending stop condition is satisfied, the operations further comprise:
adding the transaction information to a predetermined queue; and
wherein resending the transaction information to the second consensus node based on the consensus verification failure notification comprises:
searching the predetermined queue for the transaction information that corresponds to the information identifier of the transaction information in the consensus verification failure notification; and
sending the transaction information to the second consensus node.

15. The non-transitory computer-readable medium of claim 9, wherein the operations further comprise:
receiving, by the second consensus node, a preprocessed block from the first consensus node;
performing consensus verification on the preprocessed block based on transaction information stored in a transaction pool of the second consensus node and transaction information comprised in the preprocessed block;
in response to determining that at least a portion of the transaction information comprised in the preprocessed block does not exist in the transaction pool of the second consensus node, determining, by the second consensus node, an information identifier of the transaction information comprised in the preprocessed block; and
sending, by the second consensus node, a consensus verification failure notification to the first consensus node, wherein the consensus verification failure notification comprises the information identifier of the transaction information.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a first consensus node, transaction information;
sending the transaction information to a second consensus node;
receiving a consensus verification failure notification from the second consensus node, wherein the consensus verification failure notification comprises an information identifier of the transaction information, wherein the consensus verification failure notification indicates that at least a portion of the transaction information is missing from a transaction pool of the second consensus node and that a verification on the transaction information fails;
in response to receiving the consensus verification failure notification, determining whether a transaction pool of the first consensus node stores the transaction information that corresponds to the information identifier comprised in the consensus verification failure notification; and
in response to determining that the transaction pool of the first consensus node stores the transaction information that corresponds to the information identifier comprised in the consensus verification failure notification, resending, by the first consensus node, the transaction information that corresponds to the information identifier to the second consensus node.

17. The computer-implemented system of claim 16, wherein sending the transaction information to the second consensus node comprises:
creating a thread for each other consensus node; and
sending the transaction information to the second consensus node through the thread.

18. The computer-implemented system of claim 17, wherein sending the transaction information to the second consensus node through the thread comprises:
resending the transaction information to the second consensus node through the thread in response to determining that the second consensus node fails to receive the transaction information, until it is determined that the second consensus node receives the transaction information or a predetermined sending stop condition is satisfied.

19. The computer-implemented system of claim 18, wherein determining that the second consensus node receives the transaction information comprises:
determining that the second consensus node receives the transaction information in response to determining that a response signal returned by the second consensus node is received through the thread within a specified time period; and
wherein determining that the second consensus node fails to receive the transaction information comprises:
determining that the second consensus node fails to receive the transaction information in response to determining that no response signal returned by the second consensus node is received through the thread within the specified time period.

20. The computer-implemented system of claim 18, wherein the predetermined sending stop condition comprises:
- a number of times of sending the transaction information to the second consensus node reaches a predetermined number of times; or
- a time duration that elapsed since a first time the transaction information was sent to the second consensus node exceeds a predetermined duration.

* * * * *